United States Patent
Patel et al.

(10) Patent No.: US 11,736,620 B2
(45) Date of Patent: *Aug. 22, 2023

(54) SYSTEM AND METHOD FOR ESTABLISHING A COMMUNICATION SESSION WITH AN ENDPOINT OF A PLURALITY OF ENDPOINTS

(71) Applicant: Verizon Patent and Licensing Inc., Basking Ridge, NJ (US)

(72) Inventors: Gaurav B. Patel, Bridgewater, NJ (US); Shawn Pugh, Easton, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/453,667

(22) Filed: Nov. 5, 2021

(65) Prior Publication Data

US 2022/0060585 A1  Feb. 24, 2022

Related U.S. Application Data

(63) Continuation of application No. 16/398,816, filed on Apr. 30, 2019, now Pat. No. 11,178,286.

(51) Int. Cl.
*H04L 12/64* (2006.01)
*H04M 7/00* (2006.01)
*H04W 76/10* (2018.01)

(52) U.S. Cl.
CPC .......... *H04M 7/006* (2013.01); *H04W 76/10* (2018.02)

(58) Field of Classification Search
None
See application file for complete search history.

(56) References Cited

U.S. PATENT DOCUMENTS 9,712,623 B2  7/2017  Rauenbuehler et al.
11,178,286 B2 * 11/2021  Patel ..................... H04W 76/10

* cited by examiner

*Primary Examiner* — Willie J Daniel, Jr.

(57) ABSTRACT

A device may receive, from a user device, a request to establish a voice call. The device may determine that one of a plurality of endpoints is to be involved in the voice call with the user device. The device may transmit send-only invites to the plurality of endpoints. The device may receive, from a first endpoint of the plurality of endpoints, a receive-only response. The device may transmit a send-receive invite to the first endpoint, wherein the send-receive invite identifies a selected communication protocol as a communication protocol for the voice call. The device may transmit a send-receive acceptance to the user device. The send-receive acceptance may identify the communication protocol for the voice call, and upon the user device receiving the send-receive acceptance, the voice call can be established between the user device and the first endpoint.

20 Claims, 7 Drawing Sheets

SYSTEM AND METHOD FOR ESTABLISHING A COMMUNICATION SESSION WITH AN ENDPOINT OF A PLURALITY OF ENDPOINTS

RELATED APPLICATION

This application is a continuation of U.S. patent application Ser. No. 16/398,816, entitled "SYSTEM AND METHOD FOR ESTABLISHING A COMMUNICATION SESSION WITH AN ENDPOINT OF A PLURALITY OF ENDPOINTS," filed Apr. 30, 2019 (now U.S. Pat. No. 11,178,286), which is incorporated herein by reference in its entirety.

BACKGROUND

Voice calls permit audible communication between user devices. Voice calls permit users, via the user devices, to communicate by speaking and/or sending other audio over the voice call. To establish a voice call, a user device may be used to initiate the voice call via one or more processes (e.g., dialing a telephone number, selecting a contact of a contact list, robotic calling, voice dialing, and/or the like) or networks (e.g., public switched telephone network (PSTN), a cellular network, an Internet protocol (IP) network, and/or the like).

DETAILED DESCRIPTION OF PREFERRED EMBODIMENTS

The following detailed description of example implementations refers to the accompanying drawings. The same reference numbers in different drawings may identify the same or similar elements.

In some instances, a communication session, such as a voice call, is to be established between a mobile originating (MO) device (referred to herein interchangeably as an "MO" and/or user device) and a single mobile terminating (MT) device of a plurality of MT devices (referred to herein interchangeably as "MTs" and/or "endpoints"). For example, in some cases, a voice call to a particular telephone number is to be directed to a plurality of MTs. The MTs may be associated with (e.g., owned, operated by, and/or the like) a particular individual and/or a plurality of individuals (e.g., representatives that are associated with an individual associated with the telephone number). In such cases, when a calling user initiates the voice call from an MO (e.g., by dialing the telephone number), a telephony component of a network may be configured to invite the plurality of MTs to accept the voice call. The network may be an Internet protocol (IP) multimedia subsystem (IMS) network that is associated with (e.g., a network that provides telephony services to) one or more of the plurality of MOs and/or with the MO.

Using previous techniques, a telephony component of the IMS network performs several communications that cause a relatively long delay in establishing the two-way audio for the voice call. For example, once one of the MTs accepts an invite (e.g., by the MT performing an action to answer the voice call) (referred to herein as the "accepting MT"), invites sent to any remaining MTs are to be cancelled (so that multiple parties do not accept and join the same voice call), the accepting MT is to be re-invited to accept the voice call, and the MO is to be invited to use a communication protocol associated with the accepting MT. Such communications increase latency with respect to establishing a two-way audio connection, resulting in audio clipping and/or no audio capability during the latency period when a service connection is being established between the MO and the accepting MT. Furthermore, relatively long distances (e.g., long geographical distances, long communication paths within a network, and/or the like) between the MO and the accepting MT and/or the other invited MTs (referred to herein as "the remaining MTs"), can further increase such latency in establishing the two-way audio connection for the voice call due to the time required for the communications to travel the relatively long distances.

Moreover, in previous techniques, when the accepting MT accepts the voice call, audio capability is enabled by the accepting MT but is not enabled by the MO due to the latency of establishing the two-way audio connection. In such cases, during the latency, an answering user associated with the accepting MT may not realize that a connection is being established because audio from the calling user cannot be heard via the MO. Accordingly, previous techniques associated with establishing a peer to peer (P2P) communication session (involving two parties), where multiple endpoints are invited to accept invites to the communication session, may provide an undesirable user experience that results in users dropping calls (e.g., because one user cannot detect the presence of the other user over the voice call until the two-way audio connection is fully established).

According to some implementations described herein, a communication management platform enables a communication session (e.g., a voice call, an instant message session, and/or the like) to be established between an MO and one MT of a plurality of MTs with reduced latency relative to previous techniques. For example, as described herein, the communication management platform, to establish a two-way audio connection for a voice call, may reduce the number of communications between the MO and a network of the communication management platform and/or may reduce the number of communications between the network of the communication management platform and an accepting MT of the plurality of MTs, as described herein. More specifically, the communication management platform may reduce the number of communications by maintaining potential communication protocols for the voice call that are associated with the accepting MT while the communication management platform cancels invites to remaining MTs of the plurality of MTs and establishes the two-way audio connection between the MO and accepting MT. In this way, the communication management platform may conserve computing resources (e.g., of a telephony component of an IMS network, an MO, an MT, and/or the like) associated with generating transmitted messages that previously increased latency. Furthermore, the communication management platform may conserve network resources associated with previously providing and/or previously receiving messages that increased latency. Moreover, the communication management platform may improve, relative to previous techniques, a user experience associated with establishing two-way audio between the MO and the accepting MT. Such an improvement to the user experience may correspondingly prevent wasting computing resources and/or network resources consumed in association with voice calls that are ultimately dropped by a user due to the user being unaware that a two-way audio connection has yet to be established for the voice call.

Although some examples described herein involve establishing a voice call between an MO and one MT of a plurality of MTs, one or more other types of communication sessions (e.g., other types of real-time communication sessions, such as instant message sessions, video chat sessions, a specific media application session, and/or the like) may similarly be established using the systems and/or methods described herein.

Figure 1A:
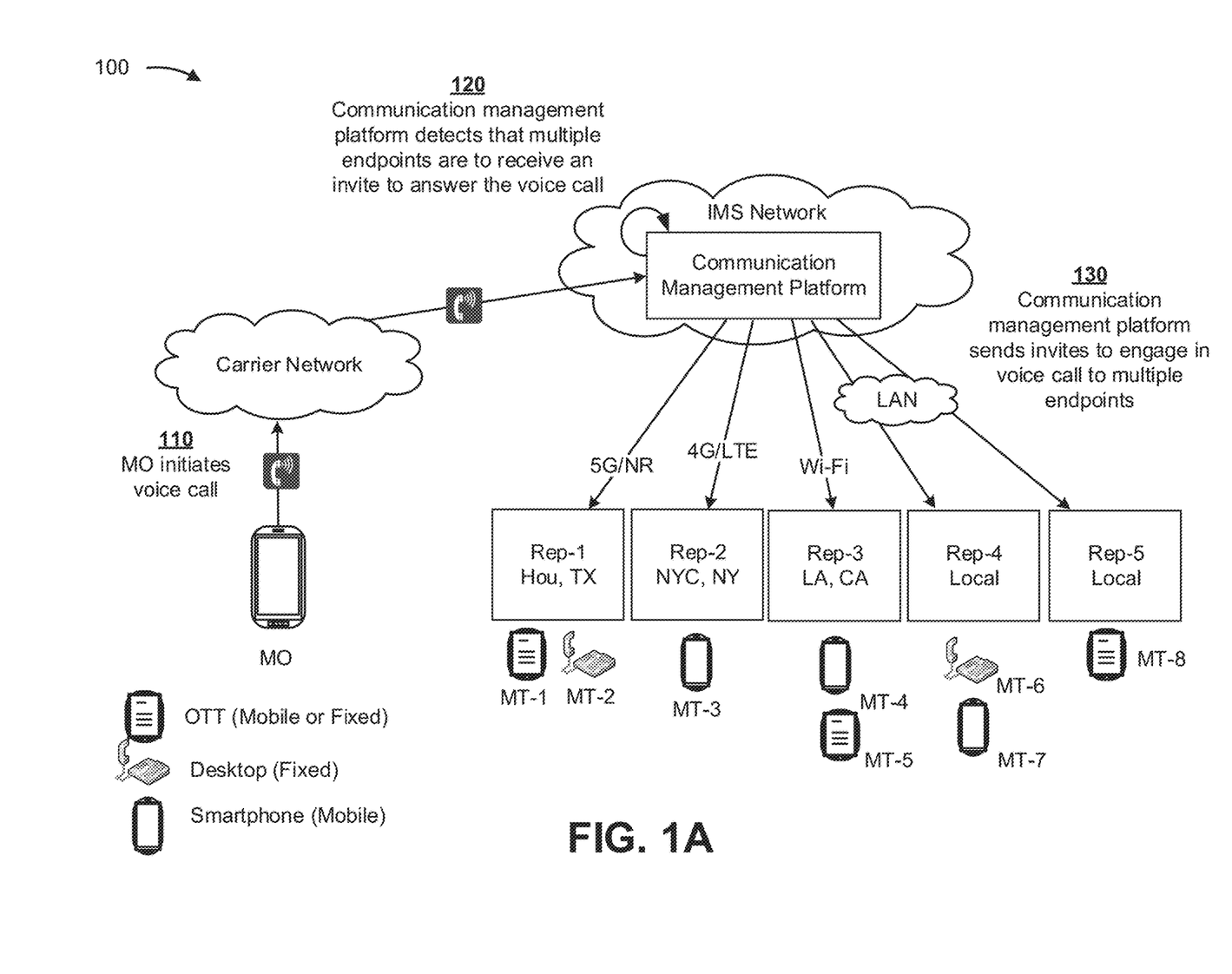
FIGS. 1A, 1B, 2, and 3 are diagrams of one or more implementations described herein.
Figure 1B:
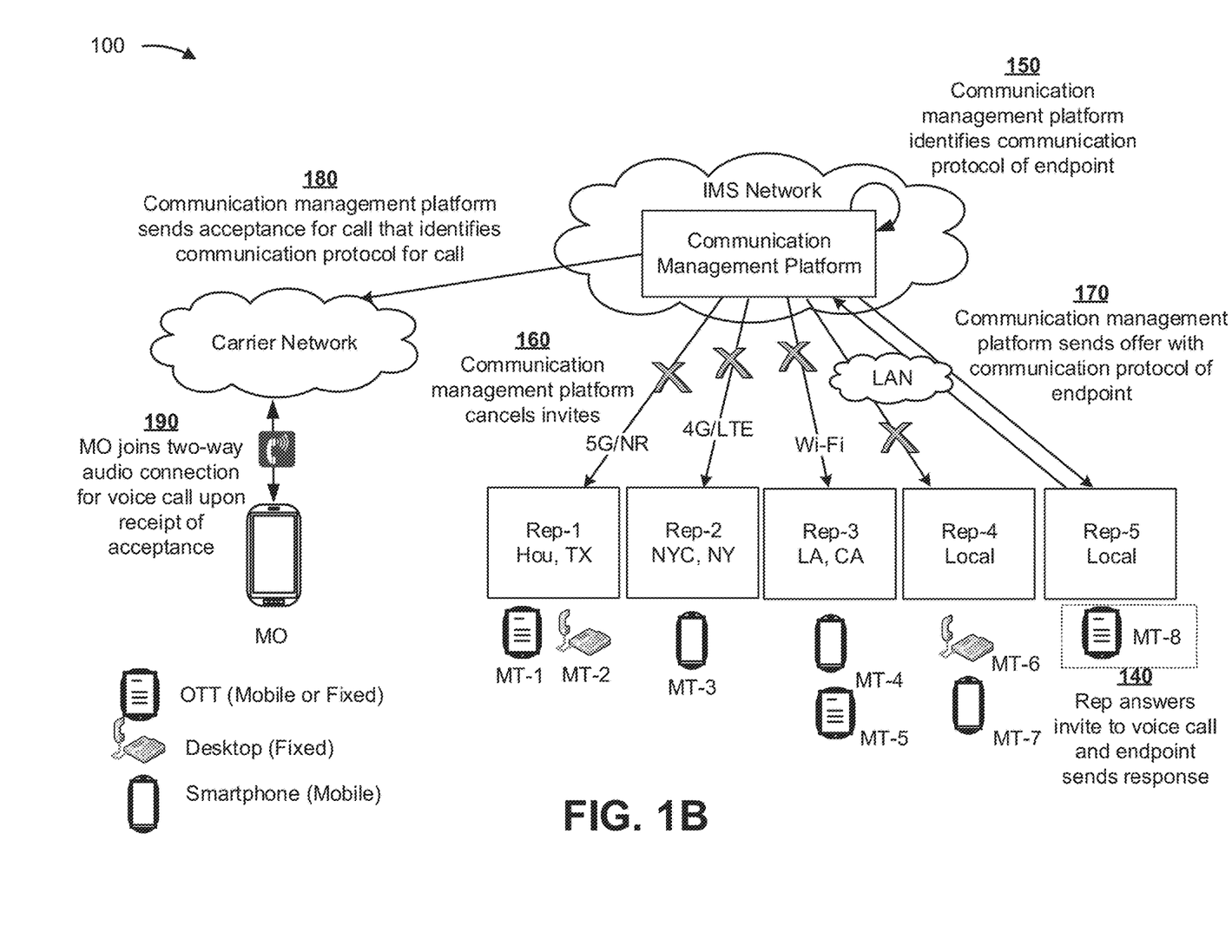

FIGS. 1A and 1B are diagrams of an example implementation 100 described herein. Example implementation 100 includes an MO, a carrier network, an IMS network with a communication management platform, and a plurality of MTs (shown as "MT-1 to MT-8") associated with a plurality of representatives (shown as Rep-1 to Rep-5). In examples described herein, a representative may be a user (e.g., an individual that receives an invite to answer a voice call or answers the invite to participate in voice call) and/or an automated answering device (e.g., a voicemail machine that provides a voice mail service, a chatbot, a call center platform, and/or the like). The IMS network may provide a platform for delivering IP multimedia services, including a telephony service managed by and/or performed by the communication management platform. The IMS network may utilize a session initiation protocol (SIP) to enable access to multimedia applications and/or voice applications via wired communications and/or wireless communications.

In example implementation 100, the plurality of MTs may be communicatively coupled with the IMS network via a variety of types of communication protocols (e.g., using a variety of types of wireless and/or wired connections). For example, as shown, MT-1 (associated with Rep-1) and MT-2 (also associated with Rep-1) are communicatively coupled with the IMS network via a 5G/New Radio (NR) connection, MT-3 (associated with Rep-2) is communicatively coupled with the IMS network via a 4G/Long Term Evolution (LTE) connection, MT-4 (associated with Rep-3) and MT-5 (also associated with Rep-3) are communicatively coupled with the IMS network via a Wi-Fi connection, and MT-6 (associated with Rep-4), MT-7 (also associated with Rep-4), and MT-8 (associated with Rep-5) are communicatively coupled with the IMS network via a local area network (LAN). Furthermore, the individuals may be located at different geographical locations (e.g., Rep-1 is in Houston, Tex., Rep-2 is in New York City, N.Y., Rep-3 is in Los Angeles, Calif., and Rep-4 and Rep-5 are local), and the MO and/or the plurality of MTs may be various types of user devices (e.g., smartphones, desk set telephones, over-the-top (OTT) devices, and/or the like). In example implementation 100, the communication management platform invites the plurality of MTs (referred to collectively as "the MTs") to accept a voice call, initiated by the MO, and establishes the voice call with an accepting MT (MT-8) using a plurality of communications that reduce latency with respect to establishing two-way audio for the voice call, as described herein.

As shown in FIG. 1A, and by reference number 110, the MO initiates a voice call (e.g., a P2P voice call). For example, a calling user associated the MO may initiate the voice call by providing a user input (e.g., using a keypad, a voice dial, selecting a contact, and/or the like) that dials a telephone number (e.g., a public switched telephone network (PSTN) number, a mobile device number (MDN), a voice over Internet protocol (VoIP) number, and/or the like). In example implementation 100, the MTs (MT-1 to MT-8) may be associated with the telephone number and/or configured to receive invites to voice calls when the telephone number is dialed. For example, the communication management platform may utilize a mapping that indicates that the MTs of example implementation 100 are to be invited to answer (or accept) voice calls to that telephone number.

To initiate the voice call with one of the MTs, the MO may send a request to establish the voice call. The request may be routed through a carrier network (e.g., a network that provides telecommunication services for the MO) to the IMS network. The communication management platform may receive the request (e.g., a SIP invite) to establish the voice call. In this way, the communication management platform may receive a request to establish a P2P voice call with one of the MTs.

As further shown in FIG. 1A, and by reference number 120, the communication management platform detects that multiple endpoints are to receive an invite to answer the voice call. For example, as described herein, the communication management platform may identify that an identifier (e.g., a telephone number) in the received request is mapped to the plurality of MTs in example implementation 100. The communication management platform may generate respective invites for MT-1 to MT-8 based on the request. For example, the invites may be generated to include available communication protocols of the MO and/or be configured for communication via respective communication protocols of MT-1 to MT-8. Accordingly, both the received request from the MO and the invites sent to MT-1 to MT-8 may identify available communication protocols of the MO. Therefore, the invites generated by the communication management platform may serve to forward the request from the MO to the MTs.

In some implementations, the invites may include send-only messages (referred to herein as "send-only invites"). The send-only invites may indicate that the MTs are to respond with a particular type of response message to acknowledge receipt of the invites and/or acceptance to the invites. For example, such particular types of response messages may include a 180 response message (e.g., a ringing response), a 200 OK receive-only message (e.g., a message that indicates a communication protocol of the receiving MT), and/or the like. In some implementations, the send-only invites may be configured as a message that indicates that a communication session (e.g., the voice call of example implementation 100) associated with the send-only invites cannot be established upon receipt of the send-only invites (whereas a send-receive message may enable two-way audio to be established upon receipt).

As described herein, various communication protocols may be used for the voice call. Such communication protocols may include one or more of an enhanced variable rate codec (EVRC), a pulse code modulation (PCM), an adaptive multi-rate (AMR), or an adaptive multi-rate wideband (AMR-WB). Accordingly, the request and/or the invites may include EVRC, PCM, AMR, AMR-WB, and/or the like.

In this way, the communication management platform may determine that the plurality of MTs are to receive invites to engage in the voice call and generate the invites to permit one of the MTs to engage in the voice call.

As further shown in FIG. 1A, and by reference number 130, the communication management platform sends invites to engage in the voice call to multiple endpoints. For example, as shown, the communication management platform (e.g., using a mapping) may send the generated invites to the MTs via the 5G/NR connection, the 4G/LTE connection, the Wi-Fi connection, and the LAN. The communication management platform may use any suitable communication protocols to send the invites to the MTs. For example, if the received request is received via a first type of communication protocol (e.g., EVRC and/or PCM) and one or more of the MTs are to receive the invites via a second type of communication protocol (e.g., AMR and/or AMR-WB), the communication management platform may use a call function to send the invites to the one or more MTs based on the respective protocols of the one or more MTs.

Based on receiving the invites, the MTs may sound a notification (e.g., via a ringer or microphone of the MTs), display a notification (e.g., via a light emitter or display of the MTs), and/or indicate a notification in any other manner (e.g., via a vibration device, movement of a mechanical device, and/or the like) to indicate that the MTs are invited to accept a voice call. In some implementations, the MTs may indicate (e.g., via a display and/or audible announcement) that the voice call is associated with a particular identifier of the MO and/or an identifier of an intended recipient (e.g., the dialed telephone number).

In this way, the communication management platform may send invites to the MTs to permit an MT to answer the invite (by sending a response) to engage in the voice call.

As shown in FIG. 1B, and by reference number 140, a representative (Rep-5) may answer the invite to the voice call via an endpoint (MT-8), and the endpoint (e.g., the accepting MT) may send a response back to the communication management platform (e.g., to indicate that the invite has been accepted). In example implementation 100, Rep-5 may be the first of the representatives to answer the ringing MTs (e.g., the individual that answers the ringing MTs before any of the other individuals answer the respective remaining ringing MTs). Accordingly, by answering MT-8 (e.g., by picking up a headset, by providing a user input that accepts the voice call, and/or the like), MT-8 may send the response to the invite.

MT-8 may be configured to select (using any suitable technique) a communication protocol that is indicated in the send-only invite from the communication management platform. As described herein, the selected communication protocol may be a same and/or a different communication protocol from potential communication protocols indicated in the request from the MO. For example, the communication protocol that the MO can use during the voice call may be different from the communication protocol that MT-8 can use during the voice call. More specifically, the MO may have communication capabilities that only include EVRC and/or PCM while MT-8 may be capable of using EVRC, PCM, AMR and/or AMR-WB. In such cases, the communication management platform may utilize a call function to adapt and/or convert communication protocols to enable the voice call to be established.

In some implementations, the response from the accepting MT is a receive-only message (referred to herein as a "receive-only response"). The receive-only response may indicate a communication protocol selected by MT-8 for the voice call. Furthermore, the receive-only response may indicate that the communication management platform is to perform appropriate operations to establish the voice call between the MO and MT-8 (e.g., cancel invites to the remaining MTs, indicate a communication protocol associated with MT-8 to MO, and/or the like).

Based on the response from MT-8 (the accepting MT) and/or the previously provided invite, the communication management platform may determine that the MO and MT-8 are the two user devices that are to be involved in a P2P voice call. In this way, the communication management platform may determine that the voice call is to be established between the MO and MT-8 to permit the communication management platform to cancel invites to the remaining MTs and indicate, to the MO, the communication protocol for the voice call.

As further shown in FIG. 1B, and by reference number 150, the communication management platform identifies a communication protocol associated with the accepting endpoint. For example, the communication management platform may identify the communication protocol of MT-8 in the response received from MT-8 (e.g., the response indicates the communication protocol). The communication management platform may then store the selected communication protocol in a data structure (e.g., a table, an index, a database, a graph, and/or the like) of the communication management platform. For example, the communication management platform may maintain a mapping (which may be referred to herein as an "answer tracker") that indicates a communication protocol for the voice call as the communication protocol selected by the accepting MT. The mapping may include similar information for a plurality of voice calls being established and/or maintained by the communication management platform.

In this way, the communication management platform may identify and maintain the communication protocol for the voice call while the communication management platform cancels the invites sent to the remaining MTs and/or while the communication management platform sends and/or receives further communications to establish the voice call.

As further shown in FIG. 1B, and by reference number 160, the communication management platform cancels the invites to the remaining MTs (e.g., the MTs (MT-1 to MT-7) that did not accept or were not the first to accept the respective invites for the voice call). For example, the communication management platform may send cancellations to the remaining MTs to prevent one of the other representatives (Rep-1 to Rep-4) from answering the invite to the voice call and/or joining the voice call (e.g., because the voice call is to be a P2P voice call, rather than a conference call). The cancellations may be any suitable messages that cancel the invites and/or prevent the remaining MTs from being able to accept the invites.

In this way, the communication management platform may cancel any outstanding invites to other MTs after a single accepting MT (MT-8) answers an invite to establish a P2P voice call between the MO and the single accepting MT.

As further shown in FIG. 1B, and by reference number 170, the communication management platform sends an offer with the selected communication protocol of the endpoint (e.g., to establish a P2P voice call). For example, the communication management platform may send a send-receive invite to the accepting MT (MT-8) that includes the selected communication protocol to permit the accepting MT to accept the voice call as the only MT that is invited to join the call. As described herein, the communication management platform may include the selected the communication protocol, which is recalled from the data structure of the communication management platform, while the communication management platform sends the cancellations to the remaining MTs. Accordingly, the one or more cancellations may be sent before the communication management platform re-invites (e.g., via a send-receive invite) the accepting MT-8 to join the voice call using the selected communication protocol.

As mentioned above, the offer to the accepting MT may be a send-receive message. The send-receive message may enable the accepting MT to join the voice call (e.g., enable two-way audio capability) upon acceptance of the offer (e.g., by sending a send-receive 200 OK response). In this way, the communication management platform may send an invite to the accepting MT to permit the accepting MT to join the voice call.

As further shown in FIG. 1B, and by reference number 180, the communication management platform sends an acceptance that identifies the communication protocol for the voice call. For example, the communication management platform may send a send-receive acceptance, such as a 200 OK response message, that includes the communication protocol selected by the accepting MT. Additionally, or alternatively, the send-receive acceptance (e.g., if the accepting MT uses a different protocol than the MO), may include a communication protocol that is to be used for the communication link between the IMS network and the MO (which would be converted to the selected communication protocol that is to be used for the voice call between the IMS network and the accepting MT).

In some implementations, while the communication management platform is sending the send-receive acceptance and/or while the MO is processing receipt of the send-receive acceptance, the accepting MT may be sending, to the communication management platform, the acceptance of the offer. Accordingly, a send-receive response can be received from the first endpoint at substantially a same time (e.g., within 500 milliseconds, within 1 second, within a threshold defined by a standard (e.g., an ultra-reliable, low latency communication (URLLC) standard), and/or the like) as the MO is receiving the send-receive acceptance.

Via transmission of the offer (as described above) and/or the acceptance, the communication management platform may establish a two-way audio connection for the voice call and/or enable the two-way audio connection to be established by the MO and/or MT once the MO and/or the MT receive the offer and/or acceptance. In this way, the communication management platform may send, to the MO, an acceptance to the request to establish a two-way audio connection for the voice call that permits the MO to join the two-way audio connection upon receipt of the acceptance.

As further shown in FIG. 1B, and by reference number 190, the MO joins the two-way audio connection for the voice call upon receipt of the acceptance. For example, the MO may join the two-way audio connection upon receipt of the acceptance. In some implementations, the MO may establish the two-way audio connection based on identifying the communication protocol (which is identified in the acceptance) for the voice call. In such a case, MT-8 may already have joined the two-way audio connection (e.g., upon receipt of the offer), but Rep-5 may not have been able to hear the calling user associated with the MO until the MO received the acceptance. Accordingly, the communication management platform may enable two-way audio (e.g., via the activated a two-way audio connection) between the MO and MT-8 upon the MO receiving the acceptance and the communication management platform receiving a response to the offer (e.g., a send-receive 200 OK response) from the accepting MT. In this way, upon the MO and the communication management platform receiving the respective messages from the communication management platform and the accepting MT, respectively, two-way audio for the voice call (e.g., that is detectable by Rep-5 and/or the calling user) is established between the MO and MT-8.

As described herein, the communication management platform may receive the send-receive response from the accepting MT at substantially the same time that the MO receives the send-receive acceptance. Therefore, a two-way audio connection (or two-way audio connectivity) may be enabled for both the MO and the accepting MT at substantially the same time. Accordingly, the send-receive response the MO and the accepting MT may join/establish the two-way audio connection of the voice call within a time period of latency that is undetectable to the calling user and/or Rep-5.

Accordingly, as described herein, a communication management platform may establish two-way audio for a voice call from an MO to multiple MTs after the communication management platform receives only a single message (the request to establish the voice call) from the MO before two-way audio for the voice call is established. Furthermore, in example implementation 100, the communication management platform transmits only two messages (the send-receive acceptance and a 180 response message (ringing)) to indicate that the voice call is being established) to the MO before two-way audio for the voice call is established.

In this way, the communication management platform may reduce latency with respect to establishing a voice call between an MO and an accepting MT of a plurality of MTs that are invited to join the voice call. Furthermore, the communication management platform may send and/or receive fewer messages, relative to previous techniques, when establishing the voice call, thus reducing the consumption of computing resources and/or network resources associated with processing and/or transmitting previous messages to establish the voice call.

As indicated above, FIGS. 1A and 1B are provided as an example. Other examples can differ from what is described with regard to FIGS. 1A and 1B.

Figure 2:
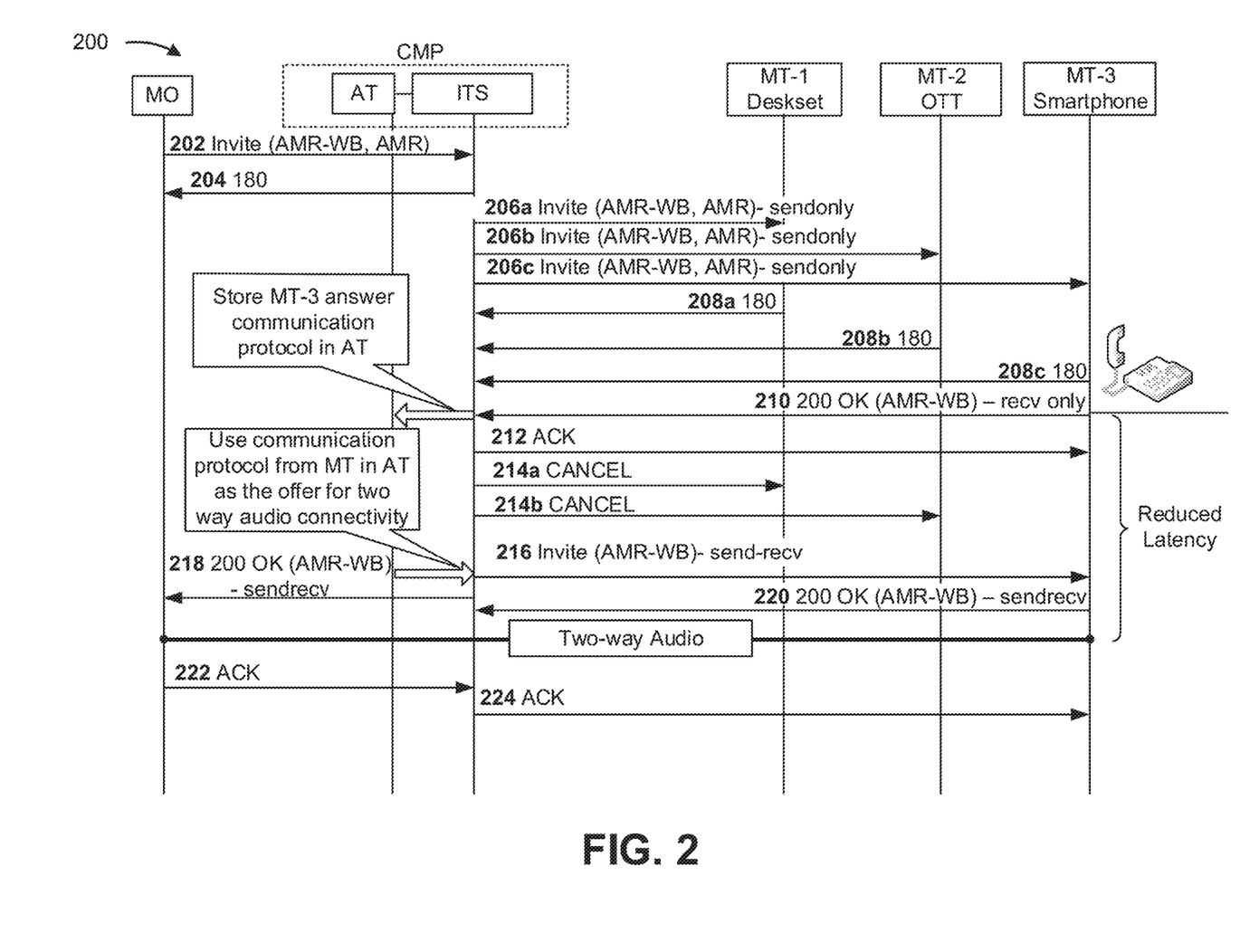

FIG. 2 provides diagrams of a call flow associated with an example implementation 200 that is capable of being performed by one or more devices described herein. The call flow may indicate signaling between an MO, a communication management platform (shown as "OH"), and multiple MTs (shown as an "MT-1 deskset," an "MT-2 OTT," and an "MT-3 smartphone"), for establishing a communication session between the MO and a single one of the MTs. In example implementation 200, the communication management platform may include an answer tracker (shown as "AT") and an intelligent telephony server (shown as "ITS"). The communication management platform, the MO and the MTs of FIG. 2 may correspond to the communication management platform, the MO, and one or more of the MTs, respectively, of FIGS. 1 and 1B.

As shown in the call flow of FIG. 2, the MO sends an invite (202) to the intelligent telephony server. The invite may include potential communication protocols (AMR, AMR-WB) for the voice call and/or indicate that the voice call is a P2P voice call (e.g., by identifying a telephone number). The intelligent telephony server responds to the MO with a 180 response message (204).

Based on determining that multiple MTs are to receive an invite to join the voice call, the intelligent telephony server sends send-only invites (206a, 206b, and 206c, respectively) to MT-1, MT-2, and MT-3 that indicate potential communication protocols (AMR, AMR-WB) for the voice call. The MTs respond to the intelligent telephony server with 180 response messages (208a, 208b, and 208c, respectively). When MT-3 answers/accepts the invite (e.g., via a user answering the call, an automated answering system answering the call, and/or the like), MT-3 sends a receive-only 200 OK response message (210) that identifies a communication protocol (AMR-WB) selected by MT-3.

As shown, upon receipt of the receive-only 200 OK response message (210) from MT-3, the intelligent telephony server stores, in the answer tracker, the communication protocol (AMR-WB) in the receive-only 200 OK response message from MT-3. Furthermore, the intelligent telephony server sends an acknowledgement (212) to MT-3 and sends cancellations (214a, 214b, respectively) to MT-1 and MT-2. The intelligent telephony server obtains (or recalls) the stored communication protocol from the answer tracker and sends, to MT-3, a send-receive invite (216) that identifies the communication protocol (AMR-WB), which was maintained in the answer tracker. The intelligent telephony server sends a send-receive 200 OK acceptance message (218) to the MO. The intelligent telephony server may send the send-receive 200 OK acceptance message (218) while waiting to receive a send-receive 200 OK response message (220) from MT-3. As shown, once the MO and the intelligent telephony server receive the send-receive 200 OK messages (218, 220, respectively), two-way audio is enabled for the voice call. As further shown in FIG. 2, the MO may send an acknowledgement (222) to the intelligent telephony server, and the intelligent telephony server may send an acknowledgement (224) to MT-3.

As shown in FIG. 2, reduced latency may be achieved by the intelligent telephony server storing information identifying the selected communication protocol for the voice call and obtaining the information to indicate the communication protocol for the voice call to MT-3 and the MO. Accordingly, the intelligent telephony server may not be required to indicate the selected communication protocol to the MO to cause the MO to re-invite the intelligent telephony server to establish the voice call with the selected communication protocol for MT-3. In this way, the communication management platform of example implementation 200, via the answer tracker and the intelligent telephony server, may conserve computing resources and/or network resources that would otherwise be used on processing and/or transmitting messages that increase latency with respect to establishing a voice call using previous techniques.

As indicated above, FIG. 2 is provided as an example. Other examples can differ from what is described with regard to FIG. 2.

Figure 3:
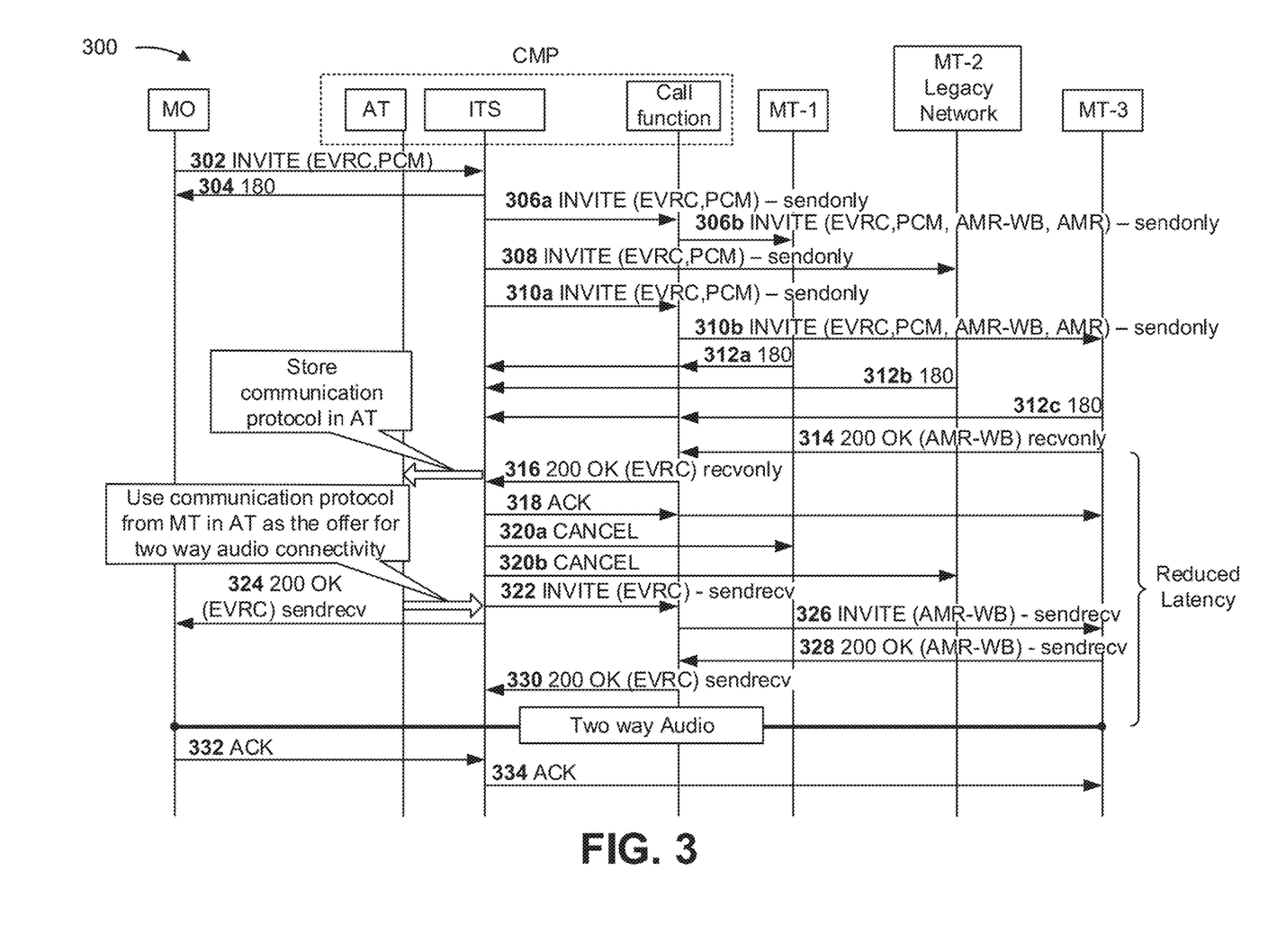

FIG. 3 provides diagrams of a call flow associated with an example implementation 300 that is capable of being performed by one or more devices described herein. The call flow may indicate signaling between an MO, a communication management platform (shown as "CMP"), one or more MTs (shown as an "MT-1 desk set," an "MT-2 Legacy network," and an "MT-3 smartphone"), for establishing a communication session between the MO and one of the MTs. In example implementation 300, the communication management platform may include an answer tracker (shown as "AT"), an intelligent telephony server (shown as "ITS"), and a call function. The communication management platform, the MO and the MTs of FIG. 3 may correspond to the communication management platform, the MO, and one or more of the MTs, respectively, of FIGS. 1A and 1B. In example implementation 300, the MO may utilize different communication protocols (e.g., have different communication capabilities, utilize different network technologies, and/or the like) than one or more of the MTs.

As shown in the call flow of FIG. 3, the MO sends an invite (302) to the intelligent telephony server. The invite may include potential legacy communication protocols (EVRC, PCM) for the voice call. The intelligent telephony server responds to the MO with a 180 response message (304).

Based on determining that multiple MTs are to receive an invite to join the voice call and that the MTs may use different communication protocols from the MO, the intelligent telephony server may invoke the call function to specify potential communication protocols for a voice call between the MO and the respective MTs. Accordingly, via the call function, the intelligent telephony server may send a send-only invite (306a) to the call function, and the call function may send a send-only invite (306b) to MT-1. The send-only invite (306a) sent to the call function may identify EVRC and PCM as potential communication protocols for the MO, and the send-only invite (306b) to MT-1 may identify EVRC, PCM, AMR, and AMR-WB as potential communication protocols for MT-1 for the voice call. Further, because the MO and MT-2 utilize a same communication protocol, the intelligent telephony server may send a send-only invite (308) to MT-2 that identifies EVRC and PCM as potential communication protocols for the voice call. And further, similar to the invite to MT-1, the intelligent telephony server may invoke the call function via a send-only invite (310a), to send an invite to MT-3 (310b) to invite MT-3 to join the voice call via EVRC, PCM, AMR, or AMR-WB. The MTs respond to the call function and/or the intelligent telephony server with 180 response messages (312a, 312b, 312c, respectively). When MT-3 answers/accepts the invite, MT-3 sends a receive-only 200 OK response message (314) that identifies a communication protocol (AMR-WB) selected by MT-3.

Upon receipt of the receive-only 200 OK response message (314), the call function selects a converted communication protocol (EVRC) for the voice call for the MO, and sends a corresponding receive-only 200 OK response message (316) to the intelligent telephony server that identifies EVRC as the communication protocol for the MO for the voice call. Then, as shown, the intelligent telephony server stores, in the answer tracker, the selected and converted communication protocol (EVRC) for the voice call. Furthermore, the intelligent telephony server sends an acknowledgement (318) to the call function and/or MT-3 and sends cancellations (320a, 320b, respectively) to MT-1 and MT-2. The call function may maintain a mapping, for the voice call, of the conversion from a communication protocol for the MO (EVRC) to the communication protocol for MT-3 (AMR-WB).

The intelligent telephony server obtains (or recalls) the stored communication protocol from the answer tracker and sends, to the call function, a send-receive invite (322) that identifies the communication protocol for the voice call, which was maintained in the answer tracker. Further, the intelligent telephony server sends a send-receive 200 OK acceptance message (324) to the MO. Meanwhile, the call function may send a send-receive invite (326) to MT-3 that identifies the communication protocol for MT-3. The call function may receive a send-receive 200 OK from MT-3 that identifies the selected communication protocol (AMR-WB) for MT-3, and the call function may send a corresponding send-receive 200 OK response message (330) that identifies the converted communication protocol (EVRC) for the voice call. As shown, once the MO and the intelligent telephony server receive the send-receive 200 OK messages (324, 330, respectively), two-way audio is enabled for the voice call. In this way, the intelligent telephony server may send the send-receive 200 OK acceptance message (324) to the MO to enable the MO to join the two-way audio connection while waiting for the send-receive 200 OK response message (330) from the call function based on the MT-3 replying with the send-receive 200 OK response message (328). As further shown in FIG. 3, the MO may send an acknowledgement (332) to the intelligent telephony server, and the intelligent telephony server may send an acknowledgement (334) to MT-3.

As shown in FIG. 3, similar to FIG. 2 and despite the intelligent telephony server invoking a call function to perform a communication protocol conversion, reduced latency may be achieved by the intelligent telephony server storing and recalling information identifying the selected communication protocol for the voice call. In this way, the communication management platform of example implementation 300, via the answer tracker, the intelligent telephony server, and the call function, may conserve computing resources and/or network resources that would otherwise be used on messages that increase latency with respect to establishing a voice call using previous techniques.

As indicated above, FIG. 3 is provided as an example. Other examples can differ from what is described with regard to FIG. 3.

Figure 4:
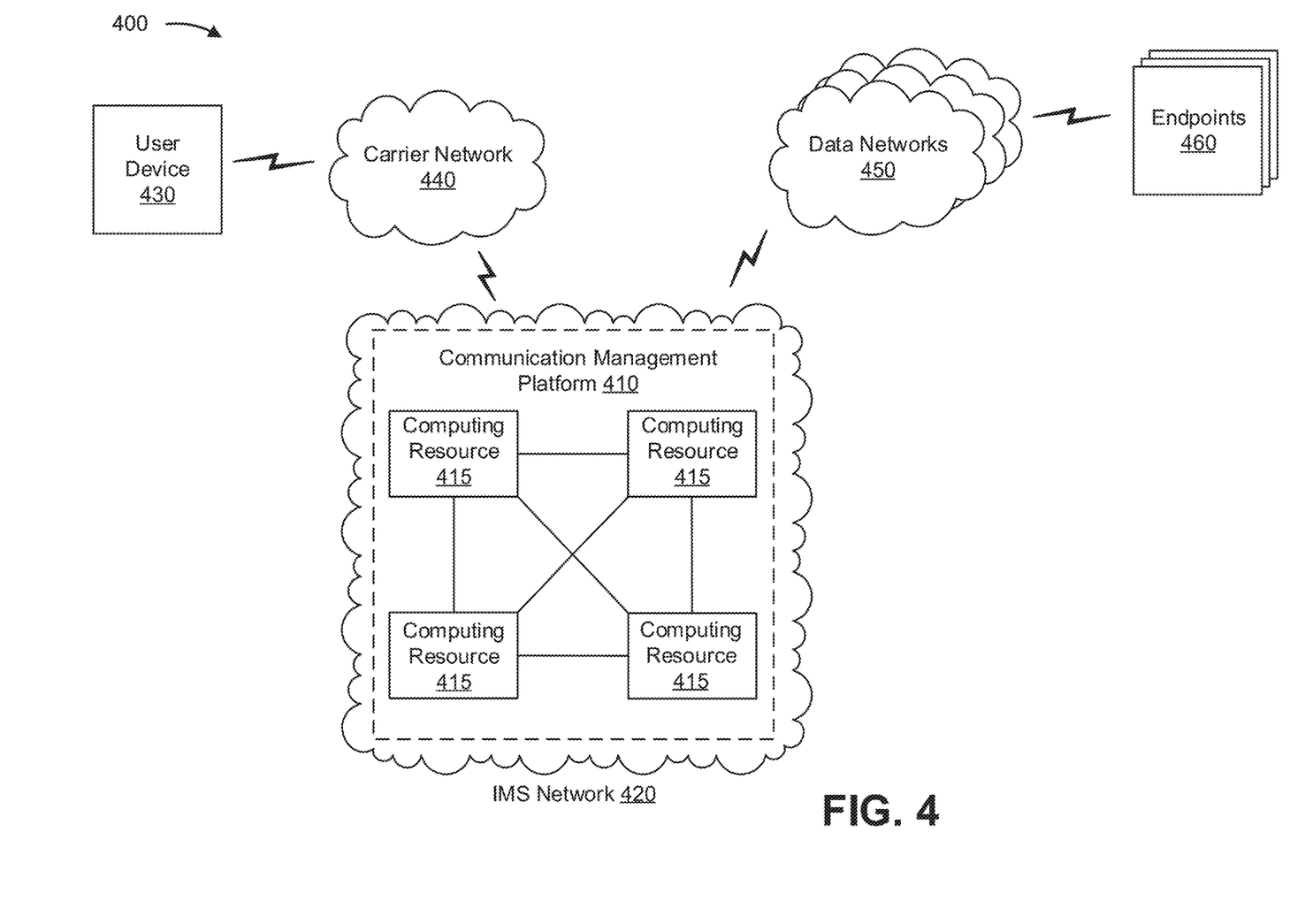
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a communication management platform 410, a computing resource 415, an IMS network 420, a user device 430, a carrier network 440, one or more data networks 450 (referred to herein individually as "data network 450" or collectively as "data networks 450"), and one or more endpoints 460 (referred to herein individually as "endpoint 460" or collectively as "endpoints 460"). Devices of environment 400 may interconnect via wired connections, wireless connections, or a combination of wired and wireless connections.

Communication management platform 410 includes one or more computing resources assigned to establish a communication session (e.g., a voice call) between a user device 430 and one or more of endpoints 460. For example, communication management platform 410 may be a platform implemented by IMS network 420 that may determine that a communication session is to be between user device 430 and a single endpoint 460 of the plurality of endpoints 460 and establish the communication session with reduced latency by maintaining a communication protocol for the communication session, while transmitting a send-receive request to the single endpoint 460 and transmitting a send-receive acceptance to user device 430, such that the communication session can be established upon the user device 430 receiving the send-receive acceptance. In some implementations, communication management platform 410 is implemented by computing resources 415 of IMS network 420.

Communication management platform 410 may include a server device or a group of server devices. In some implementations, communication management platform 410 may be hosted in IMS network 420. Notably, while implementations described herein describe communication management platform 410 as being hosted in IMS network 420, in some implementations, communication management platform 410 may be non-cloud-based or may be partially cloud-based.

IMS network 420 includes an environment that may provide computing as a service, whereby shared resources, services, etc. may be provided to user device 430 and/or endpoints 460. IMS network 420 may provide computation, software, data access, storage, and/or other services that do not require end-user knowledge of a physical location and configuration of a system and/or a device that delivers the services. As shown, IMS network 420 may include communication management platform 410 and computing resource 415.

Computing resource 415 includes one or more personal computers, workstation computers, server devices, or another type of computation and/or communication device. In some implementations, computing resource 415 may host communication management platform 410. IMS resources, IMS applications, and/or IMS functions of IMS network 420 may include compute instances executing in computing resource 415, storage devices provided in computing resource 415, data transfer devices provided by computing resource 415, and/or the like. For example, computing resource 415 may include compute instances of a last answer tracker, an intelligent telephony server, and/or one or more call functions, as described herein. In some implementations, computing resource 415 may communicate with other computing resources 415 via wired connections, wireless connections, or a combination of wired and wireless connections.

User device 430 includes one or more devices capable of receiving, generating, storing, processing, and/or providing information associated with establishing a communication session with one or more of endpoints 460. For example, user device 430 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. User device 430 may correspond to one or more of the MOs in the examples of FIGS. 1A, 1B, 2, and/or 3.

Carrier network 440 includes one or more wired and/or wireless networks. For example, carrier network 440 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Data networks 450 may include one or more wired and/or wireless data networks. For example, data network 450 can include an IMS network (e.g., another IMS network that is similar to IMS network 420), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, a Wi-Fi network, and/or the like, and/or a combination of these or other types of networks.

Endpoint 460 includes one or more devices capable of receiving and/or providing information over a network (e.g., IMS network 420, carrier network 440, data network 450, and/or the like), and/or capable of generating, storing, and/or processing information received and/or provided over the network. For example, endpoint 460 may include a computing device, such as a laptop computer, a tablet computer, a handheld computer, a desktop computer, a mobile phone (e.g., a smart phone, a radiotelephone, etc.), a personal digital assistant, a network device (e.g., a router, a gateway, a firewall, a hub, a bridge, etc.), a telephone, or a similar device. Endpoint 460 may act as an endpoint (e.g., a source and/or a destination) for a communication session with user device 430 and/or another endpoint 460. For example, a user device 430 may request to communicate with one or more endpoints 460 (e.g., via communication management platform 410, IMS network 420, carrier network 440, and/or data network 450), as described herein. Endpoints 460 may correspond to one or more of the MTs in the examples of FIGS. 1A, 1B, 2, and/or 3.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
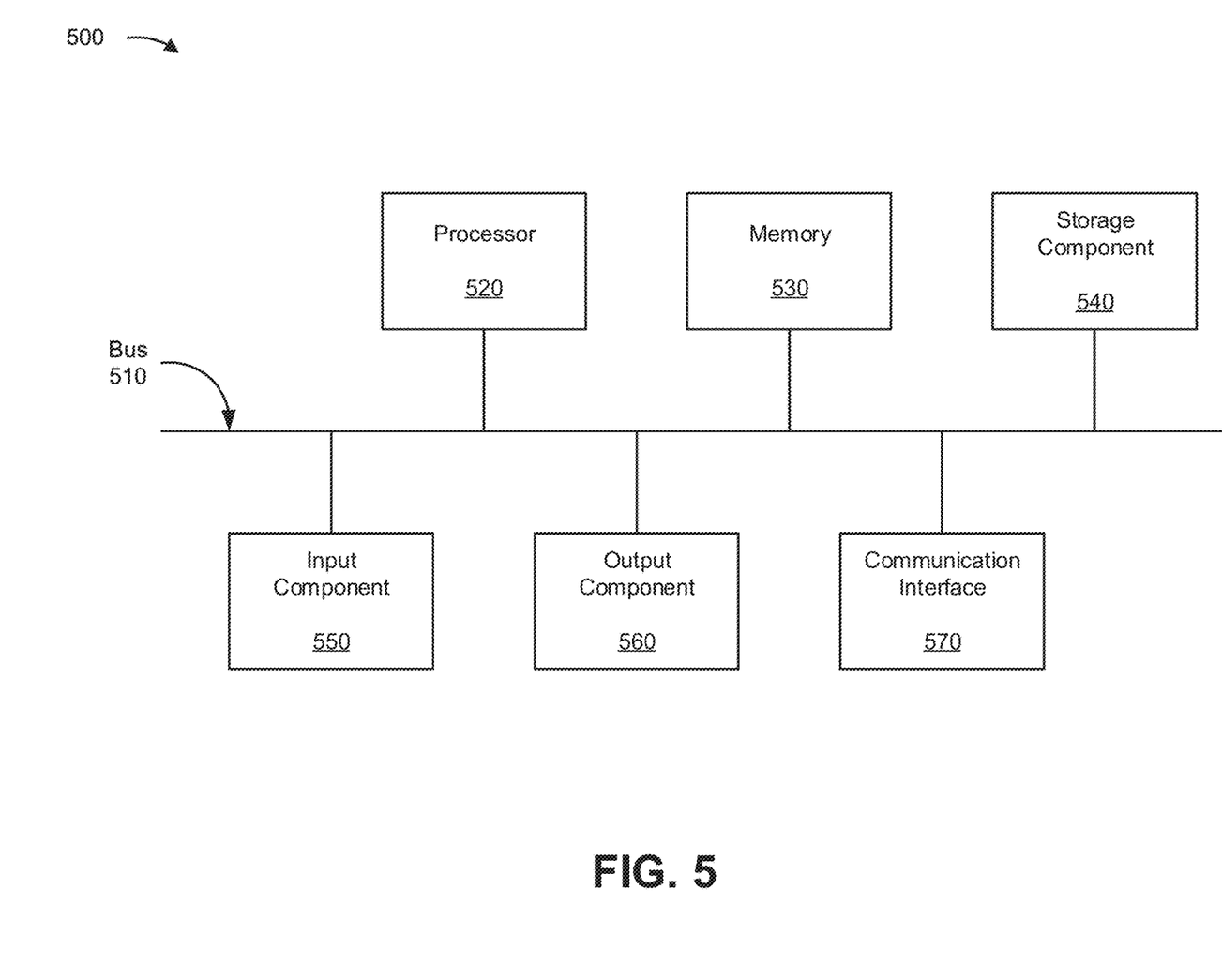
FIG. 5 is a diagram of example components of one or more devices of FIG. 4.

FIG. 5 is a diagram of example components of a device 500. Device 500 may correspond to communication management platform 410, computing resource 415, user device 430, and/or endpoint 460. In some implementations, communication management platform 410, computing resource 415, user device 430, and/or endpoint 460 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a wireless local area network interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
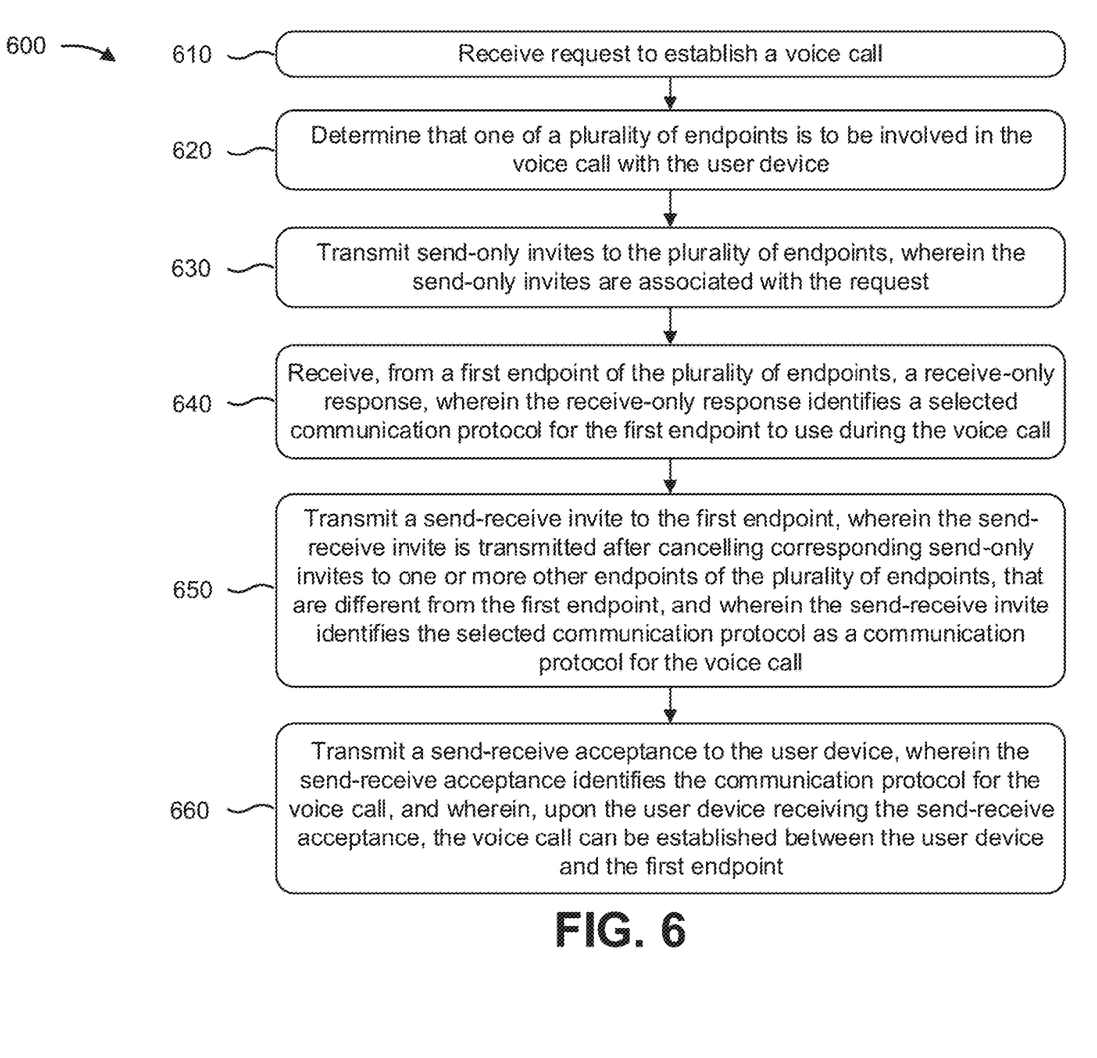
FIG. 6 is a flowchart of an example process for establishing a communication session with an endpoint of a plurality of endpoints.

FIG. 6 is a flowchart of an example process 600 for establishing a communication session with an endpoint of a plurality of endpoints. In some implementations, one or more process blocks of FIG. 6 may be performed by a communication management platform (e.g., communication management platform 410). In some implementations, one or more process blocks of FIG. 6 may be performed by another device or a group of devices separate from or including communication management platform, such as a computing resource (e.g., computing resource 415), a user device (e.g., user device 430), an endpoint (e.g., endpoint 460), and/or the like.

As shown in FIG. 6, process 600 may include receiving, from a user device, a request to establish a voice call (block 610). For example, the communication management platform (e.g., using computing resource 415, processor 520, memory 530, storage component 540, input component 550, output component 560, and communication interface 570, and/or the like) may receive, from a user device, a request to establish a voice call, as described above.

As further shown in FIG. 6, process 600 may include determining that one of a plurality of endpoints is to be involved in the voice call with the user device (block 620). For example, the communication management platform (e.g., using computing resource 415, processor 520, memory 530, storage component 540, input component 550, output component 560, and communication interface 570, and/or the like) may determine that one of a plurality of endpoints is to be involved in the voice call with the user device, as described above.

As further shown in FIG. 6, process 600 may include transmitting send-only invites to the plurality of endpoints, wherein the send-only invites are associated with the request (block 630). For example, the communication management platform (e.g., using a processor 520, a memory 530, a storage component 540, an output component 560, and a communication interface 570, and/or the like) may transmit send-only invites to the plurality of endpoints, as described above. In some implementations, the send-only invites are associated with the request.

As further shown in FIG. 6, process 600 may include receiving, from a first endpoint of the plurality of endpoints, a receive-only response, wherein the receive-only response identifies a selected communication protocol for the first endpoint to use during the voice call (block 640). For example, the communication management platform (e.g., using computing resource 415, processor 520, memory 530, storage component 540, input component 550, output component 560, and communication interface 570, and/or the like) may receive, from a first endpoint of the plurality of endpoints, a receive-only response, as described above. In some implementations, the receive-only response identifies a selected communication protocol for the first endpoint to use during the voice call (block 640).

As further shown in FIG. 6, process 600 may include transmitting a send-receive invite to the first endpoint, wherein the send-receive invite is transmitted after cancelling corresponding send-only invites to one or more other endpoints, of the plurality of endpoints, that are different from the first endpoint, and wherein the send-receive invite identifies the selected communication protocol as a communication protocol for the voice call (block 650). For example, the communication management platform (e.g., using computing resource 415, processor 520, memory 530, storage component 540, input component 550, output component 560, and communication interface 570, and/or the like) may transmit a send-receive invite to the first endpoint, as described above. In some implementations, the send-receive invite is transmitted after cancelling corresponding send-only invites to one or more other endpoints, of the plurality of endpoints, that are different from the first endpoint. In some implementations, the send-receive invite identifies the selected communication protocol as a communication protocol for the voice call.

As further shown in FIG. 6, process 600 may include transmitting a send-receive acceptance to the user device, wherein the send-receive acceptance identifies the communication protocol for the voice call, and wherein, upon the user device receiving the send-receive acceptance, the voice call can be established between the user device and the first endpoint (block 660). For example, the communication management platform (e.g., using computing resource 415, processor 520, memory 530, storage component 540, input component 550, output component 560, and communication interface 570, and/or the like) may transmit a send-receive acceptance to the user device, as described above. In some implementations, the send-receive acceptance identifies the communication protocol for the voice call. In some implementations, upon the user device receiving the send-receive acceptance, the voice call can be established between the user device and the first endpoint.

Process 600 may include additional implementations, such as any single implementation or any combination of implementations described below and/or in connection with one or more other processes described elsewhere herein.

In some implementations, the voice call is established based on a send-receive response being received from the first endpoint and the user device receiving the send-receive acceptance. In some implementations, the send-receive response is received and the user device receives the send-receive acceptance within a time period during which any latency, associated with two-way audio of the voice call, is undetectable to a user of the user device or undetectable to a user of the first endpoint. In some implementations, only a single message, associated with establishing the voice call, is received from the user device before the voice call is established between the user device and the first endpoint.

Additionally, or alternatively, a process for establishing a communication session with an endpoint of a plurality of endpoints may include receiving, from a user device, a request to establish a voice call. For example, the communication management platform (e.g., using computing resource 415, processor 520, memory 530, storage component 540, input component 550, output component 560, communication interface 570, and/or the like) may receive, by a device and from a user device, a request to establish a voice call, as described above.

Such a process may further include determining that one of a plurality of endpoints is to be involved in the voice call with the user device. For example, the communication management platform (e.g., using computing resource 415, processor 520, memory 530, storage component 540, input component 550, output component 560, communication interface 570, and/or the like) may determine that one of a plurality of endpoints is to be involved in the voice call with the user device, as described above.

Such a process may further include transmitting send-only invites to the plurality of endpoints, wherein the send-only invites are associated with the request. For example, the communication management platform (e.g., using computing resource 415, processor 520, memory 530, storage component 540, input component 550, output component 560, communication interface 570, and/or the like) may transmit send-only invites to the plurality of endpoints, as described above. In some implementations, the send-only invites are associated with the request.

Such a process may further include receiving, from a first endpoint of the plurality of endpoints, a receive-only response, wherein the receive-only response identifies a selected communication protocol for the first endpoint to use during the voice call. For example, the communication management platform (e.g., using computing resource 415, processor 520, memory 530, storage component 540, input component 550, output component 560, communication interface 570, and/or the like) may receive, from a first endpoint of the plurality of endpoints, a receive-only response, as described above. In some implementations, the receive-only response identifies a selected communication protocol for the first endpoint to use during the voice call.

Such a process may further include transmitting, based on receiving the receive-only response, one or more cancellations to one or more other endpoints, of the plurality of endpoints, that are different from the first endpoint. For example, the communication management platform (e.g., using computing resource 415, processor 520, memory 530, storage component 540, input component 550, output component 560, communication interface 570, and/or the like) may transmit, based on receiving the receive-only response, one or more cancellations to one or more other endpoints, of the plurality of endpoints, that are different from the first endpoint, as described above.

Such a process may further include transmitting a send-receive invite to the first endpoint, wherein the send-receive invite identifies the selected communication protocol as a communication protocol that the first endpoint is to use during the voice call. For example, the communication management platform (e.g., using computing resource 415, processor 520, memory 530, storage component 540, input component 550, output component 560, communication interface 570, and/or the like) may transmit a send-receive invite to the first endpoint, as described above. In some implementations, the send-receive invite identifies the selected communication protocol as a communication protocol that the first endpoint is to use during the voice call.

Such a process may further include transmitting a send-receive acceptance to the user device, wherein the send-receive acceptance identifies a communication protocol that the user device is to use during the voice call, and wherein the send-receive acceptance enables the voice call to be established between the user device and the first endpoint. For example, the communication management platform (e.g., using computing resource 415, processor 520, memory 530, storage component 540, input component 550, output component 560, communication interface 570, and/or the like) may transmit a send-receive acceptance to the user device, as described above. In some implementations, the send-receive acceptance identifies a communication protocol that the user device is to use during the voice call. In some implementations, the send-receive acceptance enables the voice call to be established between the user device and the first endpoint.

Such a process may include additional implementations, such as any single implementation or any combination of implementations described below and/or in connection with one or more other processes described elsewhere herein.

In a first implementation, a send-receive response is received from the first endpoint at substantially a same time as the user device receiving the send-receive acceptance to establish the voice call between the user device and the first endpoint. In a second implementation, alone or in combination with the first implementation, information identifying the communication protocol is stored in a data structure while the one or more cancellations are sent to the one or more other endpoints, and the one or more cancellations are sent before the send-receive invite is transmitted.

In a third implementation, alone or in combination with one or more of the first and second implementations, only a single message, associated with establishing the voice call, is received from the user device before the voice call is established between the user device and the first endpoint and the single message is the request.

In a fourth implementation, alone or in combination with one or more of the first through third implementations, the send-only invites identify one or more potential communication protocols for the voice call, and the selected communication protocol comprises one of the one or more potential communication protocols.

In a fifth implementation, alone or in combination with one or more of the first through fourth implementations, the one or more potential communication protocols may include an AMR or AMR-WB.

In a sixth implementation, alone or in combination with one or more of the first through fifth implementations, the communication protocol that the first endpoint is to use during the voice call is different from the communication protocol that the user device is to use during the voice call.

In a seventh implementation, alone or in combination with one or more of the first through sixth implementations, the communication protocol that the first endpoint is to use during the voice call includes at least one of AMR or AMR-WB, and the communication protocol that the user device is to use during the voice call includes at least one of EVRC or PCM.

In an eighth implementation, alone or in combination with one or more of the first through seventh implementations, the communication protocol that the first endpoint is to use during the voice call is the same as the communication protocol that the user device is to use during the voice call.

Additionally, or alternatively, a process for establishing a communication session with an endpoint of a plurality of endpoints may include receiving, from a user device, a request to establish a voice call. For example, the communication management platform (e.g., using computing resource 415, processor 520, memory 530, storage component 540, input component 550, output component 560, communication interface 570, and/or the like) may receive, from a user device, a request to establish a voice call, as described above.

Such a process may further include determining that one of a plurality of endpoints is to be involved in the voice call with the user device. For example, the communication management platform (e.g., using computing resource 415, processor 520, memory 530, storage component 540, input component 550, output component 560, communication interface 570, and/or the like) may determine that one of a plurality of endpoints is to be involved in the voice call with the user device, as described above.

Such a process may further include transmit send-only invites to the plurality of endpoints, wherein the send-only invites are associated with the request. For example, the communication management platform (e.g., using computing resource 415, processor 520, memory 530, storage component 540, input component 550, output component 560, communication interface 570, and/or the like) may transmit send-only invites to the plurality of endpoints, as described above. In some implementations, the send-only invites are associated with the request.

Such a process may further include receiving, from a first endpoint of the plurality of endpoints, a receive-only response to a corresponding send-only invite, of the send-only invites, transmitted to the first endpoint, wherein the receive-only response identifies a selected communication protocol for the first endpoint to use during the voice call. For example, the communication management platform (e.g., using computing resource 415, processor 520, memory 530, storage component 540, input component 550, output component 560, communication interface 570, and/or the like) may receive, from a first endpoint of the plurality of endpoints, a receive-only response to a corresponding send-only invite, of the send-only invites, transmitted to the first endpoint, as described above. In some implementations, the receive-only response identifies a selected communication protocol for the first endpoint to use during the voice call.

Such a process may further include transmitting, to a second endpoint of the plurality of endpoints, a cancellation associated with a send-only invite transmitted to the second endpoint. For example, the communication management platform (e.g., using computing resource 415, processor 520, memory 530, storage component 540, input component 550, output component 560, communication interface 570, and/or the like) may transmit, to a second endpoint of the plurality of endpoints, a cancellation associated with a send-only invite transmitted to the second endpoint, as described above.

Such a process may further include transmitting, after transmitting the cancellation, a send-receive invite to the first endpoint, wherein the send-receive invite identifies the selected communication protocol as a communication protocol for the voice call. For example, the communication management platform (e.g., using computing resource 415, processor 520, memory 530, storage component 540, input component 550, output component 560, communication interface 570, and/or the like) may transmit, after transmitting the cancellation, a send-receive invite to the first endpoint, as described above. In some implementations, the send-receive invite identifies the selected communication protocol as a communication protocol for the voice call.

Such a process may further include transmitting a send-receive acceptance to the user device, wherein the send-receive acceptance identifies the communication protocol for the voice call. For example, the communication management platform (e.g., using computing resource 415, processor 520, memory 530, storage component 540, input component 550, output component 560, communication interface 570, and/or the like) may transmit a send-receive acceptance to the user device, as described above. In some implementations, the send-receive acceptance identifies the communication protocol for the voice call.

Such a process may further include establishing the voice call between the user device and the first endpoint, wherein two-way audio for the voice call is established based on a send-receive response from the first endpoint and the user device receiving the send-receive acceptance. For example, the communication management platform (e.g., using computing resource 415, processor 520, memory 530, storage component 540, input component 550, output component 560, communication interface 570, and/or the like) may establish the voice call between the user device and the first endpoint, as described above. In some implementations, two-way audio for the voice call is established based on a send-receive response from the first endpoint and the user device receiving the send-receive acceptance.

Such a process may include additional implementations, such as any single implementation or any combination of implementations described below and/or in connection with one or more other processes described elsewhere herein.

In a first implementation, the receive-only response is received based on a user interacting with the first endpoint. In a second implementation, alone or in combination with the first implementation, only a single message, associated with establishing the voice call, is received from the user device before the voice call is established between the user device and the first endpoint, and the single message is the request.

In a third implementation, alone or in combination with one or more of the first and second implementations, the send-receive acceptance comprises a 200 OK message. In a fourth implementation, alone or in combination with one or more of the first through third implementations, only two messages are transmitted to the user device before the voice call is established between the user device and the first endpoint, and the two messages include the send-receive acceptance and a 180 response message associated with the request.

In a fourth implementation, alone or in combination with one or more of the first through third implementations, the send-only invites identify one or more potential communication protocols for the voice call based on the request including the one or more potential communication protocols, and the selected communication protocol is one of the one or more potential communication protocols. In a fifth implementation, alone or in combination with one or more of the first through fourth implementations, the selected communication protocol comprises at least one of AMR or AMR-WB.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    transmitting, by a first device, send-only invites to a plurality of second devices,
        wherein the send-only invites are associated with a request to establish a communication session associated with the plurality of second devices;
    receiving, by the first device and from a second device of the plurality of second devices, a receive-only response identifying a protocol;
    transmitting, by the first device and based on receiving the receive-only response, one or more cancellations to one or more other second devices, of the plurality of second devices, that are different from the second device;
    transmitting, by the first device and to the second device, a send-receive invite that identifies the protocol; and
    transmitting, by the first device and before receiving a send-receive response from the second device, a send-receive acceptance
        wherein a third device is to use the protocol in requesting establishing the communication session.

2. The method of claim 1, wherein the request is to establish a voice call, and
    wherein the method further comprises:
        utilizing a mapping that indicates that the second device is to be invited to accept voice calls that are associated with a particular identifier.

3. The method of claim 1, wherein the request includes information indicating a plurality of communication protocols that may be used for the communication session, and
    wherein the protocol identified in the receive-only response is based on selecting a particular protocol from the plurality of communication protocols.

4. The method of claim 1, further comprising:
    selecting, based on the receive-only response, a converted communication protocol for the communication session, and
    sending, to the third device and based on selecting the converted communication protocol, a corresponding receive-only response.

5. The method of claim 1, wherein information identifying the protocol is stored in a data structure while the one or more cancellations are sent to the one or more other second devices, and
    wherein the one or more cancellations are sent before the send-receive invite is transmitted.

6. The method of claim 1, further comprising:
    identifying, based on the receive-only response, the protocol; and
    storing the protocol in a data structure that includes a mapping of a plurality of communication protocols, including the protocol.

7. The method of claim 1, wherein determining that the plurality of second devices are to be associated with the communication session is based on a mapping.

8. A first device, comprising:
    one or more processors configured to:
        transmit send-only invites to a plurality of second devices,
            wherein the send-only invites are associated with a request to establish a communication session associated with the plurality of second devices;
        receive, from a second device of the plurality of second devices, a receive-only response identifying a protocol;
        transmit, based on receiving the receive-only response, one or more cancellations to one or more other second devices, of the plurality of second devices, that are different from the second device;
        transmit, to the second device, a send-receive invite that identifies the protocol; and
        transmit, before receiving a send-receive response from the second device, a send-receive acceptance,
            wherein a third device is to use the protocol in requesting establishing the communication session.

9. The first device of claim 8, wherein the one or more processors are further configured to:
    identify, based on the receive-only response, the protocol; and
    store the protocol in a data structure that includes a mapping of a plurality of communication protocols, including the protocol.

10. The first device of claim 8, wherein the request is to establish a voice call, and
    wherein the one or more processors are further configured to:
        utilize a mapping that indicates that the second device is to be invited to accept voice calls that are associated with a particular identifier.

11. The first device of claim 8, wherein the request includes information indicating a plurality of communication protocols that may be used for the communication session, and
    wherein the protocol identified in the receive-only response is based on selecting a particular protocol from the plurality of communication protocols.

12. The first device of claim 8, wherein the one or more processors are further configured to:
    select, based on the receive-only response, a converted communication protocol for the communication session, and
    send, to the third device and based on selecting the converted communication protocol, a corresponding receive-only response.

13. The first device of claim 8, wherein the one or more processors are configured to determine that the plurality of second devices are to be associated with the communication session based on a mapping.

14. The first device of claim 8, wherein information identifying the protocol is stored in a data structure while the one or more cancellations are sent to the one or more other second devices, and wherein the one or more cancellations are sent before the send-receive invite is transmitted.

15. A non-transitory computer-readable medium storing a set of instructions, the set of instructions comprising:
one or more instructions that, when executed by one or more processors of a first device, cause the first device to:
transmit send-only invites to a plurality of second devices,
wherein the send-only invites are associated with a request to establish a communication session associated with the plurality of second devices;
receive, from a second device of the plurality of second devices, a receive-only response,
wherein the receive-only response identifies a protocol;
transmit, based on receiving the receive-only response, one or more cancellations to one or more other second devices, of the plurality of second devices, that are different from the second device;
transmit, to the second device, a send-receive invite that identifies the protocol; and
transmit, before receiving a send-receive response from the second device, a send-receive acceptance,
wherein a third device is to use the protocol in establishing the communication session.

16. The non-transitory computer-readable medium of claim 15, wherein the one or more instructions further cause the first device to:
identify, based on the receive-only response, the protocol; and
store the protocol in a data structure that includes a mapping of a plurality of communication protocols, including the protocol.

17. The non-transitory computer-readable medium of claim 15, wherein the request is to establish a voice call, and
wherein the one or more instructions further cause the first device to:
utilize a mapping that indicates that the second device is to be invited to accept voice calls that are associated with a particular identifier.

18. The non-transitory computer-readable medium of claim 15, wherein the request includes information indicating a plurality of communication protocols that may be used for the communication session, and
wherein the protocol identified in the receive-only response is based on selecting a particular protocol from the plurality of communication protocols.

19. The non-transitory computer-readable medium of claim 15, wherein the one or more instructions further cause the first device to:
select, based on the receive-only response, a converted communication protocol for the communication session, and
send, to the third device and based on selecting the converted communication protocol, a corresponding receive-only response.

20. The non-transitory computer-readable medium of claim 15, wherein information identifying the protocol is stored in a data structure while the one or more cancellations are sent to the one or more other second devices, and
wherein the one or more cancellations are sent before the send-receive invite is transmitted.

* * * * *